United States Patent
Behrens et al.

(10) Patent No.: US 9,932,104 B2
(45) Date of Patent: Apr. 3, 2018

(54) AIRCRAFT WITH A SUBFLOOR REGION THAT ACCOMMODATES AN AUXILIARY COMPARTMENT

(71) Applicant: AIRBUS HELICOPTERS DEUTSCHLAND GMBH, Donauworth (DE)

(72) Inventors: Michael Behrens, Harburg (DE); Markus Wahnfried, Geltendorf (DE); Frank Loeser, Kaisheim (DE); Sebastian Mores, Munich (DE)

(73) Assignee: AIRBUS HELICOPTERS DEUTSCHLAND GMBH, Donauworth (DE)

( * ) Notice: Subject to any disclaimer, the term of this patent is extended or adjusted under 35 U.S.C. 154(b) by 88 days.

(21) Appl. No.: 15/014,090

(22) Filed: Feb. 3, 2016

(65) Prior Publication Data
US 2016/0229516 A1 Aug. 11, 2016

(30) Foreign Application Priority Data

Feb. 6, 2015 (EP) .................... 15400006

(51) Int. Cl.
*B64C 1/18* (2006.01)
*B64C 1/06* (2006.01)
(Continued)

(52) U.S. Cl.
CPC ................ *B64C 1/18* (2013.01); *B64C 1/062* (2013.01); *B64D 1/22* (2013.01); *B64D 9/00* (2013.01); *B64D 37/04* (2013.01); *B64D 45/00* (2013.01)

(58) Field of Classification Search
CPC .. B64C 1/18; B64C 1/062; B64D 1/22; B64D 37/04; B64D 9/00; B64D 45/00
See application file for complete search history.

(56) References Cited

U.S. PATENT DOCUMENTS 3,383,078 A 5/1968 Shohet et al.
3,398,934 A * 8/1968 Lancashire .............. B64D 1/22
258/1.4
(Continued)

FOREIGN PATENT DOCUMENTS

EP 2168871 3/2010
FR 2933375 1/2010
(Continued)

OTHER PUBLICATIONS

European Search Report for European Application No. 15400006, Completed by the European Patent Office dated Jul. 5, 2015, 8 Pages.

*Primary Examiner* — Christopher P Ellis
*Assistant Examiner* — Michael H Wang
(74) *Attorney, Agent, or Firm* — Brooks Kushman P.C.

(57) ABSTRACT

An aircraft with a fuselage and a floor structure that is arranged inside the fuselage, the floor structure and the fuselage defining a subfloor region between the floor structure and a fuselage underside of the fuselage, the subfloor region accommodating at least one auxiliary compartment, wherein an equipment bay with at least one auxiliary equipment is arranged within the subfloor region, the at least one auxiliary equipment being at least essentially stowable in the equipment bay in a stow mode and the at least one auxiliary compartment being at least partly arranged in a region between the equipment bay and the floor structure such that the at least one auxiliary compartment separates the equipment bay from the floor structure.

19 Claims, 11 Drawing Sheets

(51) Int. Cl.
*B64D 1/22* (2006.01)
*B64D 37/04* (2006.01)
*B64D 9/00* (2006.01)
*B64D 45/00* (2006.01)

(56) References Cited

U.S. PATENT DOCUMENTS

| | | | |
|---|---|---|---|
| 4,893,767 A | 1/1990 | Ferraro et al. | |
| 4,913,380 A | 4/1990 | Vardaman et al. | |
| 5,451,015 A * | 9/1995 | Cronkhite | B64D 37/02 244/119 |
| 5,582,124 A * | 12/1996 | Sikora | B63B 3/36 114/65 R |
| 5,850,991 A * | 12/1998 | Hainsworth | B64D 1/22 244/137.1 |
| 6,019,316 A * | 2/2000 | Sarlin | B64C 1/062 244/135 B |
| 6,708,926 B2 * | 3/2004 | Bonisch | B64C 1/22 244/1 TD |
| 7,357,149 B2 * | 4/2008 | Howe | B64D 37/04 137/266 |
| 8,162,264 B2 * | 4/2012 | Certain | B64C 27/006 212/275 |
| 8,308,108 B2 | 11/2012 | Cazals et al. | |
| 8,534,608 B1 * | 9/2013 | Cox, IV | B64D 1/22 244/118.1 |
| 2001/0054669 A1 * | 12/2001 | Ramage | A62C 3/0228 244/136 |
| 2005/0236516 A1 * | 10/2005 | Kolliopoulos | B64D 1/22 244/17.17 |
| 2007/0057118 A1 * | 3/2007 | Bietenhader | B64C 1/06 244/102 R |
| 2009/0146010 A1 * | 6/2009 | Cohen | B64D 1/22 244/137.1 |
| 2009/0206202 A1 * | 8/2009 | Bolukbasi | B64C 1/062 244/121 |
| 2010/0012781 A1 * | 1/2010 | Cazals | B64C 1/068 244/119 |
| 2010/0096501 A1 * | 4/2010 | Meyer | F16F 7/12 244/121 |
| 2010/0187352 A1 * | 7/2010 | Yavilevich | B64C 1/061 244/36 |
| 2011/0272523 A1 * | 11/2011 | Uegaki | B64C 1/062 244/100 A |
| 2013/0054054 A1 | 2/2013 | Tollenaere et al. | |
| 2013/0099053 A1 * | 4/2013 | Barmichev | B64C 1/10 244/102 R |
| 2013/0112811 A1 * | 5/2013 | Mayer | B64C 1/062 244/119 |
| 2014/0001312 A1 * | 1/2014 | Milliere | B64C 1/062 244/121 |
| 2014/0339367 A1 | 11/2014 | Sankrithi et al. | |
| 2015/0122940 A1 * | 5/2015 | Mairou | B64D 1/22 244/17.11 |
| 2015/0151828 A1 * | 6/2015 | Siemetzki | B64C 1/062 244/121 |

FOREIGN PATENT DOCUMENTS

| | | |
|---|---|---|
| GB | 844847 | 8/1960 |
| GB | 2495846 | 4/2013 |
| WO | 2008070946 A2 | 6/2008 |
| WO | 2008070946 A3 | 6/2008 |
| WO | 2012037595 | 3/2012 |

* cited by examiner

AIRCRAFT WITH A SUBFLOOR REGION THAT ACCOMMODATES AN AUXILIARY COMPARTMENT

CROSS REFERENCE TO RELATED APPLICATION

This application claims priority to European patent application No. 15 400006.1 filed on Feb. 6, 2015, the disclosure of which is incorporated in its entirety by reference herein.

BACKGROUND OF THE INVENTION

(1) Field of the Invention

The invention is related to an aircraft with a fuselage and a floor structure that is arranged inside said fuselage, said floor structure accommodating at least one auxiliary compartment, said aircraft comprising the features of claim 1.

(2) Description of Related Art

Aircrafts and, more particularly, rotorcrafts such as helicopters or hybrid aircrafts, such as e.g. tilt-rotors, compound aircrafts, are commonly used to fulfill aerial transportation and delivery tasks, starting from passenger transport to disaster reliefs up to carrying all kind of external loads. By way of example, helicopters are used to transport and deliver loads to mountain regions in general and, more specifically, to mountain regions where no roads exist or where roads cannot be used for transportation and delivery, e.g. due to extreme weather conditions in winter and so on. Furthermore, helicopters are used for transportation and delivery of loads or in the construction sector, where the loads may represent any kind of material. Moreover, helicopters can be used in firefighting for transportation of firefighting buckets. In addition, helicopters are also very useful in wood logging for transporting harvested wood. In all of these cases, the helicopters can be required to transport comparatively heavy external loads which can, depending on an underlying type of helicopter, weigh up to several tons.

In order to enable a given helicopter for transportation of an external load, the helicopter can be equipped with a cargo hook arrangement to which an external load mass rope for connection to the external load can be attached. Thus, a given external load can be suspended from the helicopter by means of the external load mass rope, which is particularly useful for bulky loads which do not fit into the cabin of the helicopter.

Frequently, such a cargo hook arrangement is attached to the helicopter's landing skid. By way of example, a helicopter having such a cargo hook arrangement attached to its landing skid is described in the document WO 2012/037595 A1. However, attaching the cargo hook arrangement respectively a given bracketing or structural support thereof externally to the helicopter's landing skid is aerodynamically disadvantageous, as an undesired additional drag will be produced in operation, as well as unfavorable flight mechanics in the worst case.

Alternatively, such a cargo hook arrangement is installed below the fuselage of the helicopter, i.e. at an underside of the fuselage in an area of a subfloor region of the helicopter. This subfloor region is defined between a floor structure of the helicopter that is arranged inside the helicopter and a fuselage underside of the fuselage and can generally be used to accommodate one or more auxiliary compartments, such as fuel tanks of the helicopter. By way of example, the document U.S. Pat. No. 5,451,015 describes a helicopter with a fuel tank arrangement that is accommodated in its subfloor region.

A cargo hook arrangement that is installed below the fuselage of the helicopter, i.e. at an underside of the fuselage in an area of a subfloor region, is typically attached to the fuselage respectively its mainframe, since this is the primary structure that is designed to withstand all loads which may occur in various load cases during lifetime of the helicopter. A corresponding helicopter having such a cargo hook arrangement attached to its fuselage is e.g. described in the documents EP 2 168 871 A1, U.S. Pat. No. 8,534,608 B1 and U.S. 2013/0054054 A1. In all of these helicopters, the cargo hook arrangement introduces all loads such as sling loads, crash loads or any other applied loads into the mainframe of the helicopter via the helicopter's subfloor frame structure.

One major load case that may occur during the lifetime of a helicopter is a crash, wherein the primary structure, especially the subfloor region, must absorb and withstand all occurring energy. Therefore, for perfect crash incidence, the subfloor region is ideally designed without any disturbing factors. However, one exemplary disturbing factor is the externally mounted cargo hook arrangement, which is attached to the fuselage underside protruding from the helicopter's outer shell and any fuel tanks placed inside the subfloor region.

Furthermore, such an externally mounted cargo hook arrangement decreases the overall aerodynamic performances of the helicopter. More specifically, due to a given bracketing or structural support thereof, which is externally attached to the fuselage, the overall aerodynamic performances of the helicopter are decreased, as an undesired additional drag will be produced in operation, as well as unfavorable flight mechanics in the worst case.

In order to avoid such an undesired additional drag and unfavorable flight mechanics, the cargo hook arrangement can be arranged inside an equipment bay, which is integrated into the subfloor region of the helicopter instead of the one or more auxiliary compartments described above. The document U.S. Pat. No. 5,850,991 describes such a helicopter with a cargo hook arrangement, which is deployable from an associated equipment bay in operation for carrying external loads, and stowable inside the equipment bay when not in use. The associated equipment bay is installed in the subfloor region of the helicopter such that loads introduced from the cargo hook arrangement are transferred to an adjacent subfloor frame structure. Furthermore, the associated equipment bay can be accessed from inside the helicopter via a removable floor panel.

However, in this helicopter the integration of the associated equipment bay into the subfloor region leads to a significant decrease in an effective fuel tank volume of the helicopter, as the complete subfloor region is used to accommodate the equipment bay, i.e. the cargo hook arrangement. Furthermore, if a crash occurs in operation of the cargo hook arrangement, the cargo hook arrangement may protrude into the inside of the helicopter, thereby endangering crew members.

The document U.S. Pat. No. 4,893,767 describes another helicopter with a cargo hook arrangement, wherein the latter is mainly installed inside the helicopter. Associated with this cargo hook arrangement is a cargo hook that is attached to a cable, which can be deployed out of the helicopter through a cable and equipment guide that is integrated in the form of a funnel respectively through hole into the helicopter's fuselage. However, the integration of the cable and equipment guide into the helicopter's fuselage leads at least to a reduction of available subfloor space for the integration of fuel tanks, so that an effective fuel tank volume of the helicopter is also decreased significantly.

In summary, helicopters with externally mounted cargo hook arrangements will have disadvantages in crash situations, where the cargo hook arrangements hit the ground first. In such crash load cases, the crash loads will be transferred to the fuselage mainframe and the cargo hook arrangement will protrude into the helicopter's subfloor region, which commonly comprises fuel tanks, if a given critical area is not protected by an additional structure. Thus, the externally mounted cargo hook arrangements and, more generally any externally attached equipment, does not only affect the crashworthiness of the helicopters, but consequently lead to higher certification efforts. Additionally, such externally mounted cargo hook arrangements do not provide for a favorable aerodynamic influence since they produce additional drag in operation, leading to increased fuel consumption, reduced velocity or higher required power to reach the intended velocities.

In contrast thereto, cargo hook arrangements that are mounted in associated equipment bays in the helicopter's subfloor region provide for ameliorated aerodynamics and are favorable during crash situations, since the subfloor mainframe will hit the ground first and absorb the crash loads. However, there is a major disadvantage consisting in a lack of space for accommodating fuel tanks. In other words, the provision of such equipment bays reduces the fuel tank volume significantly so that the helicopter comprises less fuel than it could if the subfloor region would be used entirely for the fuel tank volume.

BRIEF SUMMARY OF THE INVENTION

It is, therefore, an object of the present invention to provide a new helicopter and, more generally, a new aircraft with a crashworthy subfloor region, wherein a crashworthy equipment bay with an auxiliary equipment is integrated that has minimal effect on underlying aerodynamics of the aircraft and that does not unnecessarily waste fuel tank volume.

This object is solved by an aircraft with a fuselage and a floor structure that is arranged inside said fuselage, said floor structure accommodating at least one auxiliary compartment and an equipment bay, said aircraft comprising the features of claim 1.

More specifically, according to the present invention an aircraft with a fuselage and a floor structure that is arranged inside the fuselage is provided, wherein the floor structure and the fuselage define a subfloor region between the floor structure and a fuselage underside of said fuselage, and wherein the subfloor region accommodates at least one auxiliary compartment. The aircraft comprises an equipment bay with at least one auxiliary equipment that is arranged within the subfloor region. The at least one auxiliary equipment is at least essentially stowable in the equipment bay in a stow mode. The at least one auxiliary compartment is at least partly arranged in a region between the equipment bay and the floor structure such that the at least one auxiliary compartment separates the equipment bay from the floor structure.

It should be noted that the expression "at least essentially stowable in the stow mode" preferably refers to a continuous and durable accommodation of the at least one auxiliary equipment in the equipment bay. In other words, the at least one auxiliary equipment is not intended to be retracted from the equipment bay for operation or utilization and to be restowed therein afterwards. Instead, the at least one auxiliary equipment is preferably accommodated in the equipment bay such that it may at most adjust its stow position in the equipment bay to an operation position that is required for utilization or operation thereof.

According to one aspect of the present invention, the subfloor region of the aircraft defines a storage space which is positioned below the floor structure of the aircraft, in which passengers, crew members, loads and equipment etc. are placed. The subfloor region on the other hand is used for material such as fuel, fuel system, avionics, computers and cargo hook arrangements, which is storable in the inventive auxiliary compartment and/or equipment bay.

Preferably, the subfloor region is adapted to protect the passengers and crew members in case of crash incidences. Therefore, the subfloor region preferentially comprises structural elements, which must be able to absorb the energy occurring in a crash, and which are commonly called "primary structure". This primary structure is comprised of essentially transversal and essentially longitudinal frame components that are adapted for providing structural stiffness as well as for withstanding all loads that are applied to the aircraft.

More specifically, the subfloor region preferably comprises a subfloor height that is selected from a range between 0.04 times and 0.56 times of a fuselage width of the aircraft. The fuselage width is defined by a maximum distance measured orthogonally to a longitudinal mid-plane of the aircraft between respective outmost lateral left hand and right hand side fuselage surfaces. The subfloor height preferentially amounts to 0.26 times of the fuselage width.

Preferably, the at least one auxiliary compartment comprises a compartment height that is selected from a range between 0.03 times and 0.9 times of the subfloor height, and preferentially amounts to 0.5 times of said subfloor height.

Preferably, the equipment bay comprises a height that amounts at least to the difference between the subfloor height and the compartment height.

Preferably, a distance between the fuselage underside and a lower end of the at least one auxiliary equipment positioned in the stow mode adjacent to the fuselage underside is selected from a range between −0.95 times and 0.35 times of the subfloor height, and preferentially amounts to 0.05 times of the subfloor height.

Preferably, the equipment bay comprises a length that is selected from a range between 0.05 times and 0.8 times of the fuselage width, and preferentially amounts to 0.3 times of the fuselage width.

According to one aspect of the present invention, the aircraft is embodied as a rotorcraft and, in particular, as a helicopter. In this helicopter, the equipment bay is preferably embodied as a cargo hook compartment that accommodates an associated cargo hook arrangement as auxiliary equipment. However, it should be noted that the present invention is not limited to an accommodation of a cargo hook arrangement in the equipment bay of the inventive helicopter and that other auxiliary equipment can likewise be installed therein, such as e.g. a machine gun, one or more sling load cameras, lights, radars and so on.

Advantageously, the cargo hook arrangement is at least essentially and, preferably, completely stowable in the cargo hook compartment in the stow mode. This leads to streamlined aerodynamics of the inventive helicopter in operation, resulting in a reduced fuel consumption and improved flight mechanics.

Preferably, the subfloor region of the inventive helicopter comprises several fuel tanks, wherein the auxiliary compartment is embodied as at least one additional fuel tank that is arranged on top of the cargo hook compartment, i.e. between the cargo hook compartment and the helicopter's floor structure. Accordingly, a fuel tank arrangement can be accommodated in the subfloor region, which comprises e.g. one or more front fuel tanks, one or more rear fuel tanks, one or more lateral fuel tanks on each side of the cargo hook compartment and one or more top fuel tanks on top of the cargo hook compartment. However, it should be noted that the present invention is not limited to use of the auxiliary compartment as a top fuel tank and that the auxiliary compartment can likewise be used as a simple storage space, which may further be accessible from the helicopter's cabin via the floor structure thereof, e.g. via a suitable removable floor panel.

Advantageously, by integrating a top fuel tank above the cargo hook compartment into the subfloor region, an additional fuel volume can be provided to the inventive helicopter. Thus, the helicopter's operating range can be increased significantly.

According to one aspect of the present invention, the cargo hook arrangement submerges in case of a crash of the inventive helicopter preferably entirely into the cargo hook compartment in order to protect at least the top fuel tank, but preferentially also all other fuel tanks in the subfloor region, as well as to diminish any loads applied to the cargo hook arrangement during the crash. Thus, the cargo hook arrangement is only minimally influenced by occurring crash loads, so that fewer efforts for certification of the cargo hook arrangement are to be expected.

Furthermore, the crash loads that are applied to the subfloor primary structure of the inventive helicopter during the crash can at least be reduced. In other words, crash loads that are applied during a crash of the helicopter to its fuselage as such can be absorbed or at least reduced according to the present invention in order to prevent any structural impact on the subfloor primary structure. This is preferably achieved by an attachment of the cargo hook arrangement to the subfloor primary structure, which is preferentially provided with an inventive crash fuse element in order to absorb all energy occurring during a crash of the inventive helicopter. Thus, the subfloor primary structure in the area of the cargo hook arrangement can be provided with less weight compared to the conventional primary structure, since the crash loads transferred from the cargo hook arrangement to the subfloor primary structure are reduced. This, in turn, leads to less total weight of the inventive helicopter and, hence, to a more efficient helicopter.

According to one aspect of the present invention, the submerging of the cargo hook arrangement into the cargo hook compartment can be achieved by means of a rotation of the cargo hook arrangement during a crash, so that the cargo hook arrangement is deflected on one side and, thus, reduces its vertical extension, or by an absorption of crash forces acting on the cargo hook arrangement by means of the crash fuse element, which will consequently break in case of a crash. Alternatively, the submerging can be achieved via suitable damping means or by means of a suitable load absorbing attachment.

According to a preferred embodiment, the equipment bay comprises at least one outer wall that separates the at least one auxiliary equipment from the at least one auxiliary compartment.

According to a further preferred embodiment, the subfloor region is provided with a crashworthy frame structure defined by transversal frame components and longitudinal frame components. The at least one auxiliary equipment is mounted to predetermined transversal and/or longitudinal frame components of the crashworthy frame structure. Preferably, the at least one auxiliary equipment is rotatably mounted to the predetermined transversal and/or longitudinal frame components.

According to a further preferred embodiment, the at least one auxiliary equipment comprises a shaft that is mounted to the predetermined transversal and/or longitudinal frame components of the crashworthy frame structure. Preferably, the shaft is a rotation shaft that defines a rotation axis, and that is rotatably mounted to the predetermined transversal and/or longitudinal frame components. Preferentially, the rotation axis of the rotation shaft of the at least one auxiliary equipment is arranged in the equipment bay at a distance from the fuselage underside that is preferably smaller than the height of the equipment bay.

According to a further preferred embodiment, the at least one auxiliary equipment is forcibly moveable in the equipment bay in a crash load case from a stow position associated with the stow mode into at least one crash position associated with a crash mode of the at least one auxiliary equipment. Preferably, the at least one auxiliary equipment is forcibly rotatable around the rotation axis of the above mentioned rotation shaft in the equipment bay.

According to a further preferred embodiment, the shaft is mounted to the predetermined transversal and/or longitudinal frame components of the crashworthy frame structure by means of structural frame attachments. Preferably, the shaft is a rotation shaft that is rotatably mounted to the predetermined transversal and/or longitudinal frame components.

According to a further preferred embodiment, at least one of the structural frame attachments is provided with a crash fuse mount that holds the shaft. The crash fuse mount is adapted for absorbing energy in a crash load case. Preferably, the shaft is a rotation shaft and the crash fuse mount holds the rotation shaft.

According to a further preferred embodiment, the crash fuse mount comprises at least one crash fuse element that is provided with predetermined breaking points. The predetermined breaking points are adapted for breaking in the crash load case.

According to a further preferred embodiment, the structural frame attachments are mounted to the predetermined transversal and/or longitudinal frame components of the crashworthy frame structure by means of associated fixation means.

According to a further preferred embodiment, the equipment bay comprises an access door for closing the equipment bay in the stow mode, preferably sealingly.

According to a further preferred embodiment, a plurality of fuel tanks is arranged around the equipment bay within the subfloor region, wherein the at least one auxiliary compartment defines a top fuel tank.

According to a further preferred embodiment, the equipment bay is arranged within the subfloor region on the side of at least one lateral fuel tank, wherein the at least one auxiliary compartment defines a top fuel tank that is an integral part of the at least one lateral fuel tank.

According to a further preferred embodiment, the equipment bay is separated from the at least one lateral fuel tank by at least one longitudinal frame component.

According to a further preferred embodiment, the equipment bay is arranged within the subfloor region behind at least one front fuel tank and/or in front of at least one rear fuel tank, wherein the at least one auxiliary compartment defines a top fuel tank that is an integral part of the at least one front fuel tank and/or the at least one rear fuel tank.

According to a further preferred embodiment, the equipment bay is separated from the at least one front fuel tank and/or the at least one rear fuel tank by at least one transversal frame component.

According to a further preferred embodiment, the at least one auxiliary equipment is a cargo hook arrangement, wherein the equipment bay defines a cargo hook compartment.

BRIEF DESCRIPTION OF THE SEVERAL VIEWS OF THE DRAWINGS

Preferred embodiments of the invention are outlined by way of example in the following description with reference to the attached drawings. In these attached drawings, identical or identically functioning components and elements are labeled with identical reference numbers and characters and are, consequently, only described once in the following description.

DETAILED DESCRIPTION OF THE INVENTION

Figure 1:
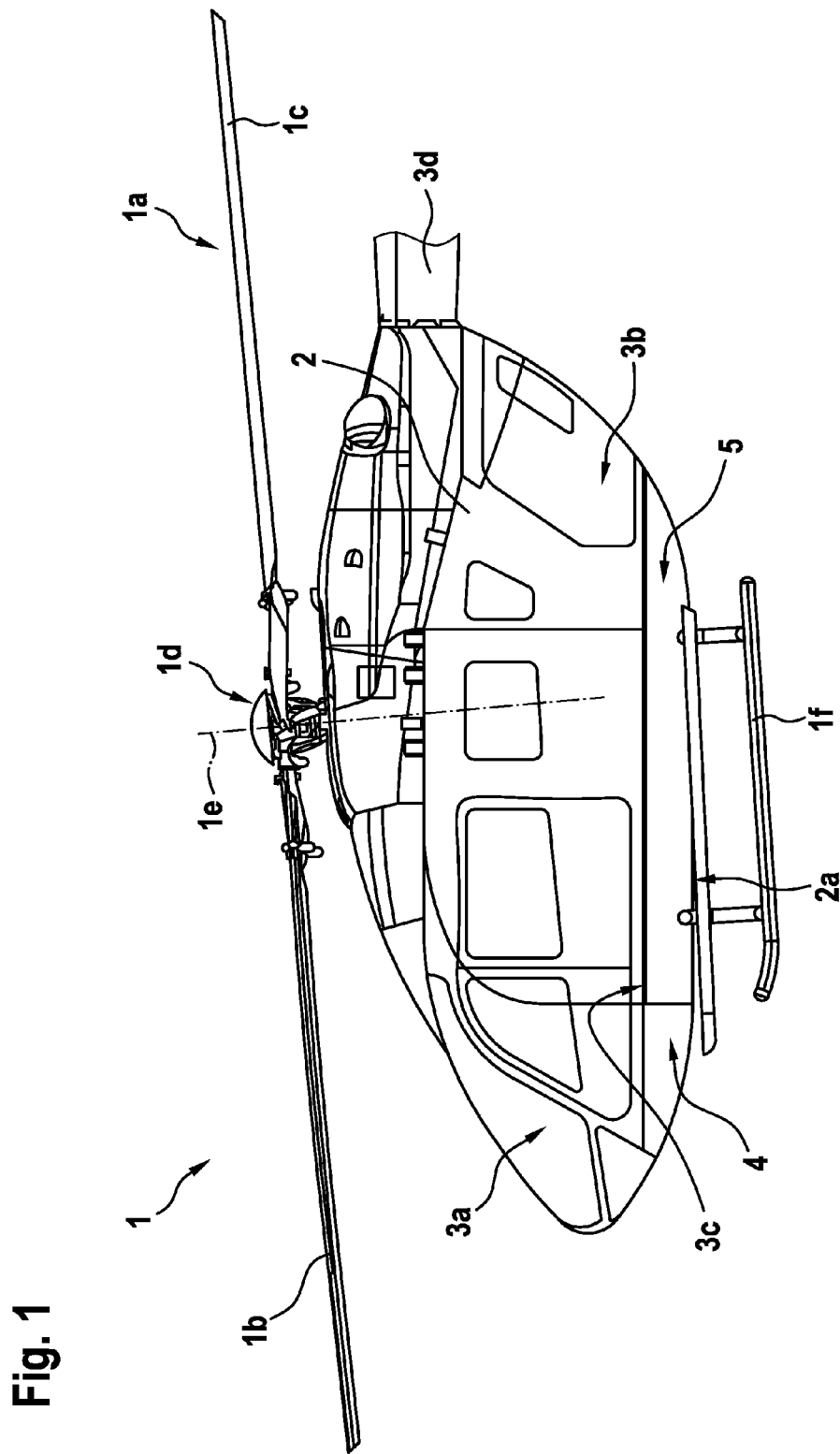
FIG. 1 shows a side view of an aircraft with a subfloor region according to the present invention.

FIG. 1 shows an aircraft 1 according to one aspect of the present invention, which comprises a fuselage 2 with a subfloor region 4. The aircraft 1 is exemplarily embodied as a rotary-wing aircraft and, more particularly, as a helicopter with at least one multi-blade main rotor 1a for providing lift and forward or backward thrust during operation. Therefore, the aircraft 1 is also referred to hereinafter as the "helicopter 1" for simplicity and clarity. It should, however, be noted that the present invention is not limited to helicopters and can likewise be applied to other aircrafts having a fuselage with a subfloor region according to the present invention.

The at least one multi-blade main rotor 1a illustratively comprises a plurality of rotor blades 1b, 1c. The latter are mounted at an associated rotor head 1d to a rotor shaft, which rotates in operation of the helicopter 1 around an associated rotor axis 1e.

The fuselage 2 comprises a fuselage underside 2a that is illustratively connected to a landing gear 1f. The latter is exemplarily embodied as a skid-type landing gear.

Preferably, the fuselage 2 defines a cockpit 3a and a cargo compartment 3b of the helicopter 1 and is provided with a floor structure 3c that is arranged inside the fuselage 2. The floor structure 3c and the fuselage 2 define the subfloor region 4, which is illustratively arranged between the floor structure 3c and the fuselage underside 2a of the fuselage 2. The latter also defines a tail boom 3d, which is cut away and not shown in greater detail, for simplicity and clarity of the drawings.

According to one aspect of the present invention, the subfloor region 4 accommodates a subfloor arrangement 5. A preferred embodiment of the subfloor arrangement 5 is described below with reference to FIG. 2 and the following figures.

Furthermore, the helicopter 1 may comprise one or more counter-torque devices configured to provide counter-torque during operation, i.e. to counter the torque created by rotation of the at least one multi-blade main rotor 1a for purposes of balancing the helicopter 1 in terms of yaw. The at least one counter-torque device can be provided at the tail boom 3d, which may further be provided e.g. with a horizontal stabilizer, a bumper, a tail wing and/or a fin.

Figure 2:
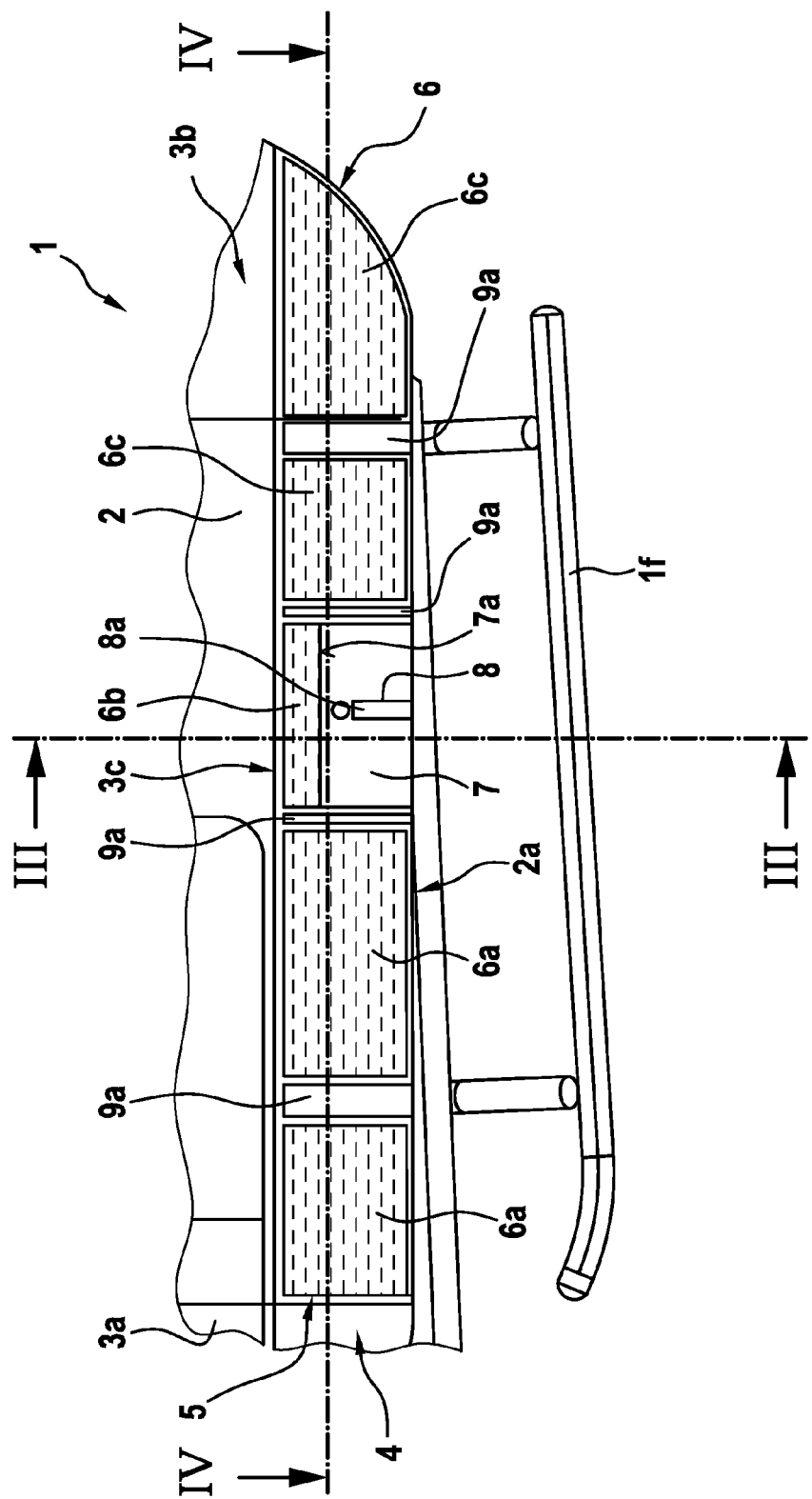
FIG. 2 shows a detail view of the subfloor region of FIG. 1 with a subfloor arrangement having an auxiliary compartment and an equipment bay according to the present invention.

FIG. 2 shows the subfloor region 4 of the helicopter 1 of FIG. 1, which is arranged between the floor structure 3c and the fuselage underside 2a of the fuselage 2 of FIG. 1. The fuselage 2 is connected at the fuselage underside 2a to the landing gear 1f of FIG. 1. The subfloor region 4 comprises the subfloor arrangement 5 of FIG. 1.

According to one aspect of the present invention, the subfloor arrangement 5 comprises one or more auxiliary compartments 6b and one or more equipment bays 7, each being at least adapted for accommodating at least one auxiliary equipment 8. Illustratively, a single auxiliary compartment 6b and a single equipment bay 7 with a single auxiliary equipment 8 are provided, which are arranged within the subfloor region 4. At least the single equipment bay 7 is preferably positioned in the region of the rotor axis 1e of FIG. 1, preferentially congruent therewith, in order to fulfil aeromechanical requirements.

The subfloor region 4 is preferentially provided with a crashworthy frame structure that is defined by transversal frame components 9a and longitudinal frame components 9b for providing structural stiffness. This crashworthy frame structure is a so-called "primary structure", which defines a load-bearing construction that is adapted to absorb forces acting thereon.

Preferably, the auxiliary equipment 8 is at least essentially and, preferentially, completely stowable in the equipment bay 7 in a stow mode. Furthermore, the auxiliary equipment 8 is preferably rotatably mounted to predetermined transversal and/or longitudinal frame components 9a, 9b of the crashworthy frame structure of the subfloor region 4. Therefore, the auxiliary equipment 8 comprises e.g. a rotation shaft 8a that is rotatably mounted to the predetermined transversal and/or longitudinal frame components 9a, 9b. However, it should be noted that the rotation shaft 8a is merely described by way of example and not for restricting the present invention thereto. In other words, the rotation shaft 8a is only optional and not required for all type of auxiliary equipment. Instead, in particular embodiments a non-rotatable shaft may likewise be applied.

According to one aspect of the present invention, the equipment bay 7 is separated from the floor structure 3c by means of the auxiliary compartment 6b, which is at least partly arranged in a region between the equipment bay 7 and the floor structure 3c. Preferably, the equipment bay 7 comprises at least one outer wall 7a that separates the auxiliary equipment 8 that is installed in the equipment bay 7 from the auxiliary compartment 6b.

By way of example, the equipment bay 7 defines a cargo hook compartment, wherein a cargo hook arrangement defines the auxiliary equipment 8. Accordingly, the equipment bay 7 is also referred to as the "cargo hook compartment 7" and the auxiliary equipment 8 as the "cargo hook arrangement 8" hereinafter, for clarity and simplicity. It should be noted that the cargo hook arrangement 8 must be provided with the rotation shaft 8a in order to allow a rotation of the cargo hook arrangement 8 at least in a normal operation mode thereof, when lifting and towing external loads. However, as already described above, it is pointed out that the present invention is not restricted to the cargo hook compartment 7 with the cargo hook arrangement 8 and that also another auxiliary equipment can be provided for use with the inventive equipment bay.

According to one aspect of the present invention, the auxiliary compartment 6b is implemented as a fuel tank of a fuel tank arrangement 6. The latter preferably comprises a plurality of fuel tanks 6a, 6b, 6c (and 6d in FIG. 3) that are arranged around the cargo hook compartment 7 within the subfloor region 4.

More specifically, the auxiliary compartment 6b illustratively defines a top fuel tank 6b within the subfloor region 4, wherein the term "top" refers to an on-ground position of the helicopter 1. However, as already described above, it is pointed out that the present invention is not restricted to realization of such a top fuel tank and that the auxiliary compartment 6b may alternatively define a simple storage space that could even be accessible via the floor structure 3c.

The cargo hook compartment 7 is preferably arranged within the subfloor region 4 behind one or more front fuel tanks 6a and/or in front of one or more rear fuel tanks 6c, wherein the terms "front" and "rear" refer to a forward flight direction of the helicopter 1 in operation. Furthermore, the cargo hook compartment 7 is preferentially separated from at least one of the front fuel tanks 6a and/or at least one of the rear fuel tanks 6c by at least one of the transversal frame components 9a.

Figure 3:
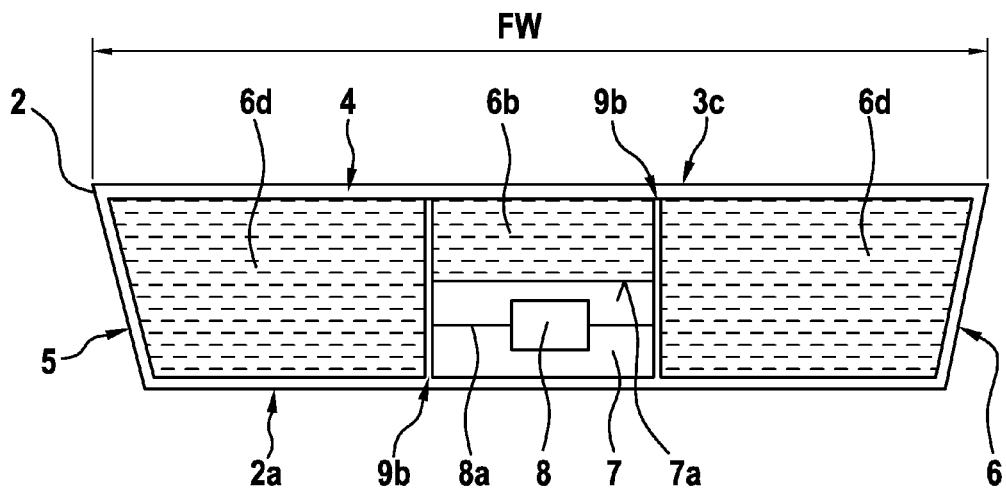
FIG. 3 shows a sectional view of the subfloor region of FIG. 2, seen along section line III-III of FIG. 2.

FIG. 3 shows the fuselage 2 of the helicopter 1 of FIG. 1 and FIG. 2 with the subfloor region 4 of FIG. 1 and FIG. 2 that accommodates the subfloor arrangement 5 of FIG. 2 with the fuel tank arrangement 6 and the cargo hook compartment 7 of FIG. 2. Illustratively, the fuselage 2 has a fuselage width FW that is defined by a maximum distance measured orthogonally to a longitudinal mid-plane of the helicopter 1 of FIG. 1 and FIG. 2 between respective outmost lateral left hand and right hand side fuselage surfaces.

According to one aspect of the present invention, the fuel tank arrangement 6 now comprises in addition to the front, top and rear fuel tanks 6a, 6b, 6c of FIG. 2 at least one and, illustratively, two lateral fuel tanks 6d, wherein the term "lateral" refers to a forward flight direction of the helicopter 1 of FIG. 1 and FIG. 2 in operation. Each one of the lateral fuel tanks 6d is preferably arranged on one side of the cargo hook compartment 7, which is preferentially separated from at least one of the lateral fuel tanks 6d by at least one of the longitudinal frame components 9b of FIG. 2. Furthermore, at least one and, preferably, each one of the lateral fuel tanks 6d is separated from the top fuel tank 6b by at least one of the longitudinal frame components 9b.

Figure 4:
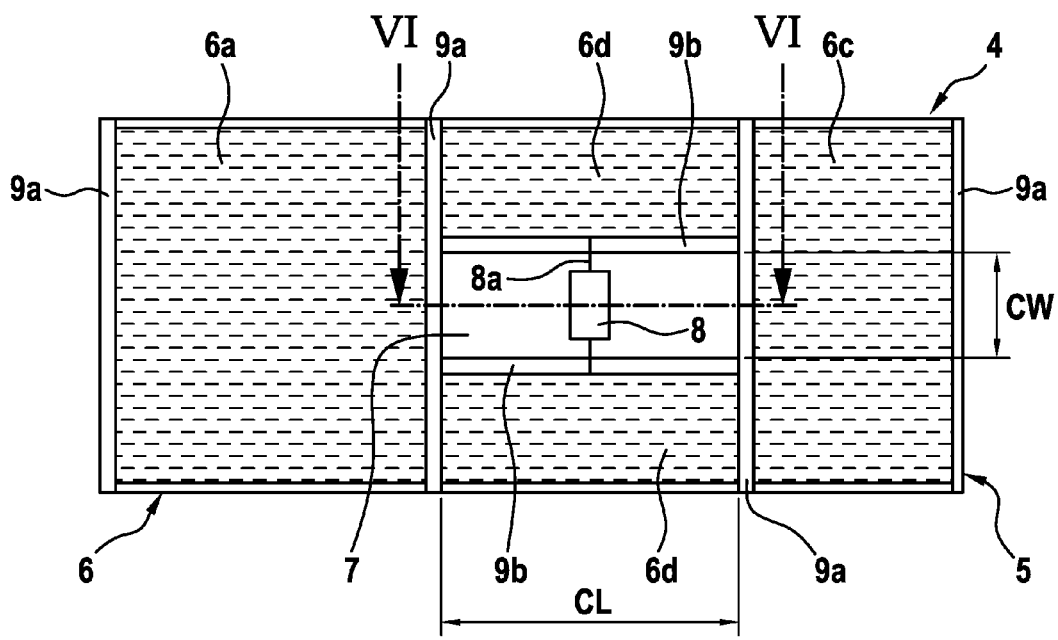
FIG. 4 shows a sectional view of the subfloor region of FIG. 2, seen along section line IV-IV of FIG. 2.

FIG. 4 shows the subfloor region 4 of the preceding figures that accommodates the subfloor arrangement 5 with the fuel tank arrangement 6 and the cargo hook compartment 7 with the cargo hook arrangement 8 of the preceding figures. FIG. 4 further illustrates the separation of the front and rear fuel tanks 6a, 6c of the fuel tank arrangement 6 from the cargo hook compartment 7 by means of the transversal frame components 9a of FIG. 2, as well as the separation of the lateral fuel tanks 6d of the fuel tank arrangement 6 from the cargo hook compartment 7 by means of the longitudinal frame components 9b of FIG. 3.

Preferably, the transversal and/or longitudinal frame components 9a, 9b are used for carrying the rotation shaft 8a of the cargo hook arrangement 8. Illustratively, the latter is rotatably mounted to the longitudinal frame components 9b.

According to one aspect of the present invention, the cargo hook compartment 7 comprises a length CL that is selected from a range between 0.05 times and 0.8 times of the fuselage width FW of FIG. 3, and preferentially amounts to 0.3 times of this fuselage width FW. Furthermore, the cargo hook compartment 7 comprises a width CW that preferably amounts to 0.3 times of the fuselage width FW, but preferentially at least to less than 0.5 times of its length CL.

Figure 5:
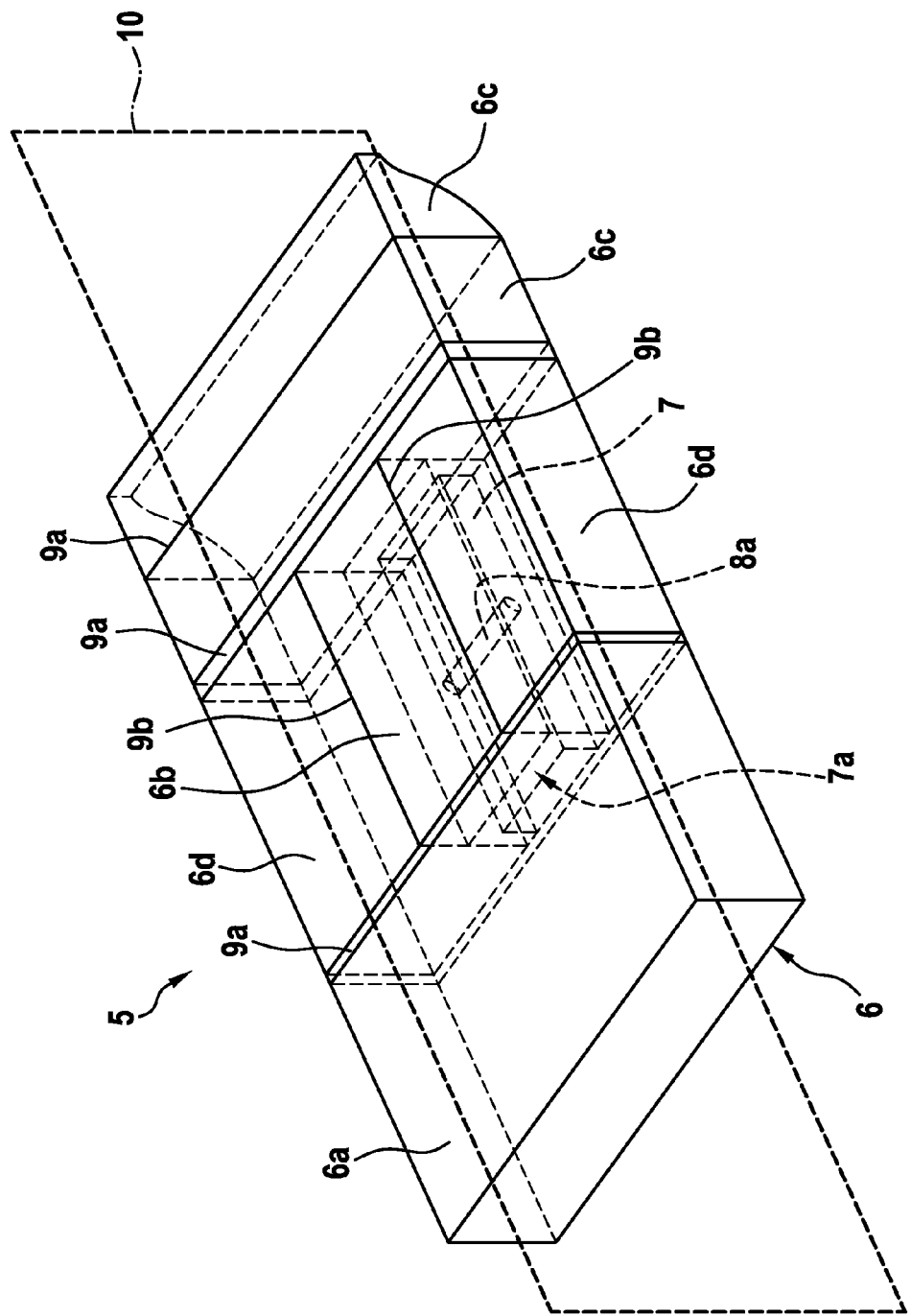
FIG. 5 shows a perspective view of the subfloor arrangement of FIG. 2.

FIG. 5 shows the subfloor arrangement 5 with the fuel tank arrangement 6 and the cargo hook compartment 7 of the preceding figures, for further illustrating the embedded arrangement of the cargo hook compartment 7 within the fuel tank arrangement 6. More specifically, FIG. 5 clarifies the stacked arrangement of the cargo hook compartment 7 and the top fuel tank 6b of the fuel tank arrangement 6 with respect to a longitudinal mid-plane 10 of the helicopter 1 of FIG. 1 and FIG. 2, which illustratively defines a longitudinal symmetry plane of the subfloor arrangement 5.

Figure 6:
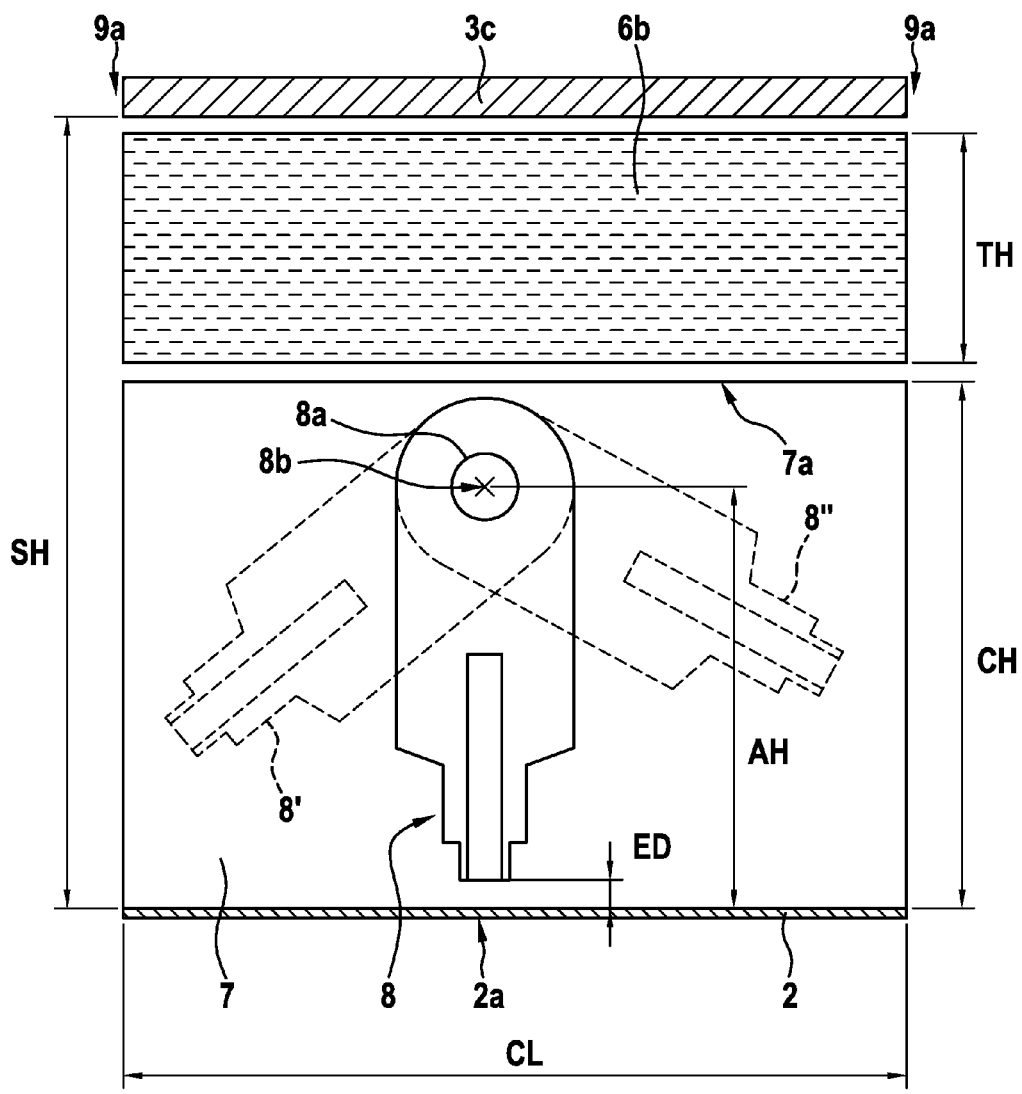
FIG. 6 shows a sectional view of a detail of the subfloor arrangement of FIG. 2, seen along section line VI-VI of FIG. 4.

FIG. 6 shows the top fuel tank 6b and the cargo hook compartment 7 of the preceding figures, which are arranged at least partly between the transversal frame components 9a of the preceding figures. More specifically, the top fuel tank 6b and the cargo hook compartment 7 are arranged in stacked manner between the floor structure 3c and the fuselage underside 2a of the fuselage 2 of the preceding figures.

The floor structure 3c and the fuselage underside 2a are illustratively separated from each other by a distance SH that defines a height of the subfloor region 4 of the preceding figures and is, therefore, hereinafter also referred to as the "subfloor height SH". Preferably, this subfloor height SH is selected from a range between 0.04 times and 0.56 times of the fuselage width FW of FIG. 3. The subfloor height SH preferentially amounts to 0.26 times of the fuselage width FW.

As described above, the cargo hook compartment 7 accommodates the cargo hook arrangement 8 of the preceding figures, which is rotatably mounted to the cargo hook compartment 7 by means of the rotation shaft 8a of the preceding figures. The latter defines a rotation axis 8b for rotation of the cargo hook arrangement 8 in the cargo hook compartment 7.

Illustratively, the cargo hook compartment 7 has a height CH, which is preferably greater than a distance AH measured between the rotation axis 8b and the fuselage underside 2a. According to one aspect of the present invention, the height CH amounts at least to the difference between the subfloor height SH and a height TH of the top fuel tank 6b. Consequently, by reducing the height CH, the height TH of the top fuel tank 6b can be increased and, thus, a corresponding fuel tank volume thereof. Preferably, the height TH is selected from a range between 0.03 times and 0.9 times of the subfloor height SH, and preferentially amounts to 0.5 times of the subfloor height SH.

The cargo hook arrangement 8 is shown in a continuous line for illustrating an operation position thereof in an associated operation mode. By way of example, the illustrated operation position corresponds to a stow position associated with the stow mode of the cargo hook arrangement 8, wherein the latter is preferably at least essentially and, exemplarily completely, stowed in the cargo hook compartment 7.

According to one aspect of the present invention, a lower end of the cargo hook arrangement 8 in the stow position is adjacent to the fuselage underside 2a and spaced apart from this fuselage underside by a predetermined distance ED. This distance ED is preferably selected from a range between −0.95 times and 0.35 times of the subfloor height SH, and preferentially amounts to 0.05 times of the subfloor height SH.

It should be noted that if the predetermined distance ED is negative, the lower end of the cargo hook arrangement 8 protrudes from the fuselage underside 2a. This may e.g. be required if the helicopter 1 of FIG. 1 and FIG. 2 is retrofitted with a higher loaded, more powerful cargo hook arrangement, which may be larger as the cargo hook arrangement 8, or if the cargo hook arrangement 8 is only integrated partially into the cargo hook compartment 7 in order to merely reduce its aerodynamic effect. In the case of the higher loaded, more powerful cargo hook arrangement, the latter may not submerge entirely into the cargo hook compartment 7 in case of a crash, but nevertheless, this preferably does not affect the preferred configuration and shape of the cargo hook compartment 7, which will consequently not change in shape.

It should further be noted that the cargo hook arrangement 8 is also shown twice in dotted lines for illustrating two different, exemplary crash positions 8', 8" associated with a crash mode of the cargo hook arrangement 8 in the cargo hook compartment 7. Preferably, the cargo hook arrangement 8 is at least forcibly rotatable around the rotation axis 8b defined by the rotation shaft 8a in the cargo hook compartment 7 in a crash load case from the stow position into at least one of the crash positions 8', 8". According to one aspect of the present invention, the cargo hook arrangement 8 will initially be rotated in the crash load case from the stow or operation position into one of the crash positions 8', 8", prior to possible subsequent crash measures as described below with reference to FIG. 8.

Figure 7:
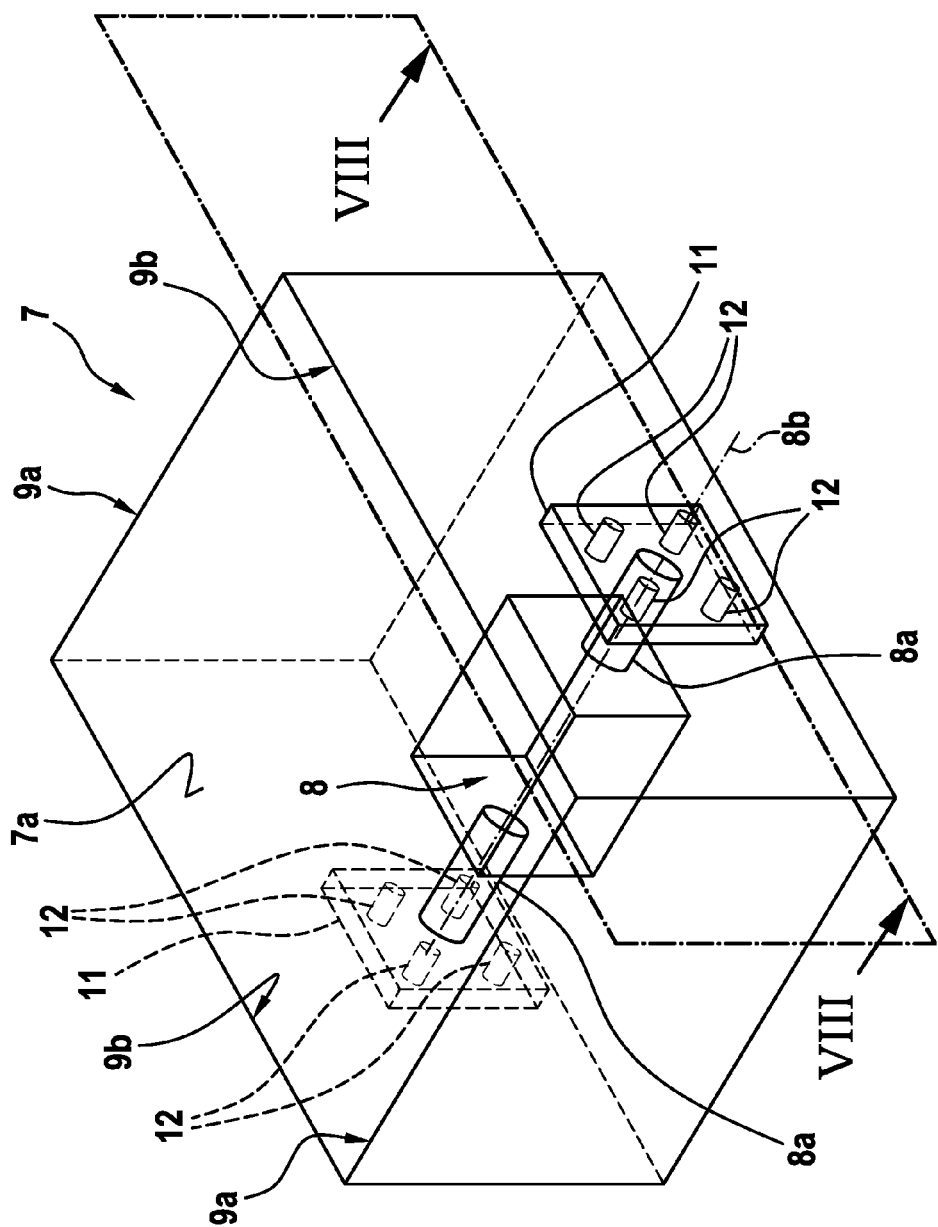
FIG. 7 shows a perspective view of the equipment bay of FIG. 2.

FIG. 7 shows the cargo hook compartment 7 with the cargo hook arrangement 8 of the preceding figures, which is rotatably mounted to the cargo hook compartment 7 by means of the rotation shaft 8a. According to one aspect of the present invention, all side walls that are connected to the outer wall 7a of the cargo hook compartment 7 are defined by the transversal and longitudinal frame components 9a, 9b of the crashworthy frame structure 9a, 9b of the preceding figures. Alternatively, separate side walls can be provided.

Preferably, the cargo hook arrangement 8 is rotatably mounted to the longitudinal frame components 9b of the crashworthy frame structure 9a, 9b of the preceding figures by means of structural frame attachments 11. The latter are preferably mounted to the longitudinal frame components 9b by means of associated fixation means 12, such as screws or rivets.

It should be noted that the rotation shaft 8a respectively the structural frame attachments 11 are only illustratively mounted to the longitudinal frame components 9b. However, they can likewise be mounted to the transversal frame components 9a, as described below with reference to FIG. 11.

Figure 8:
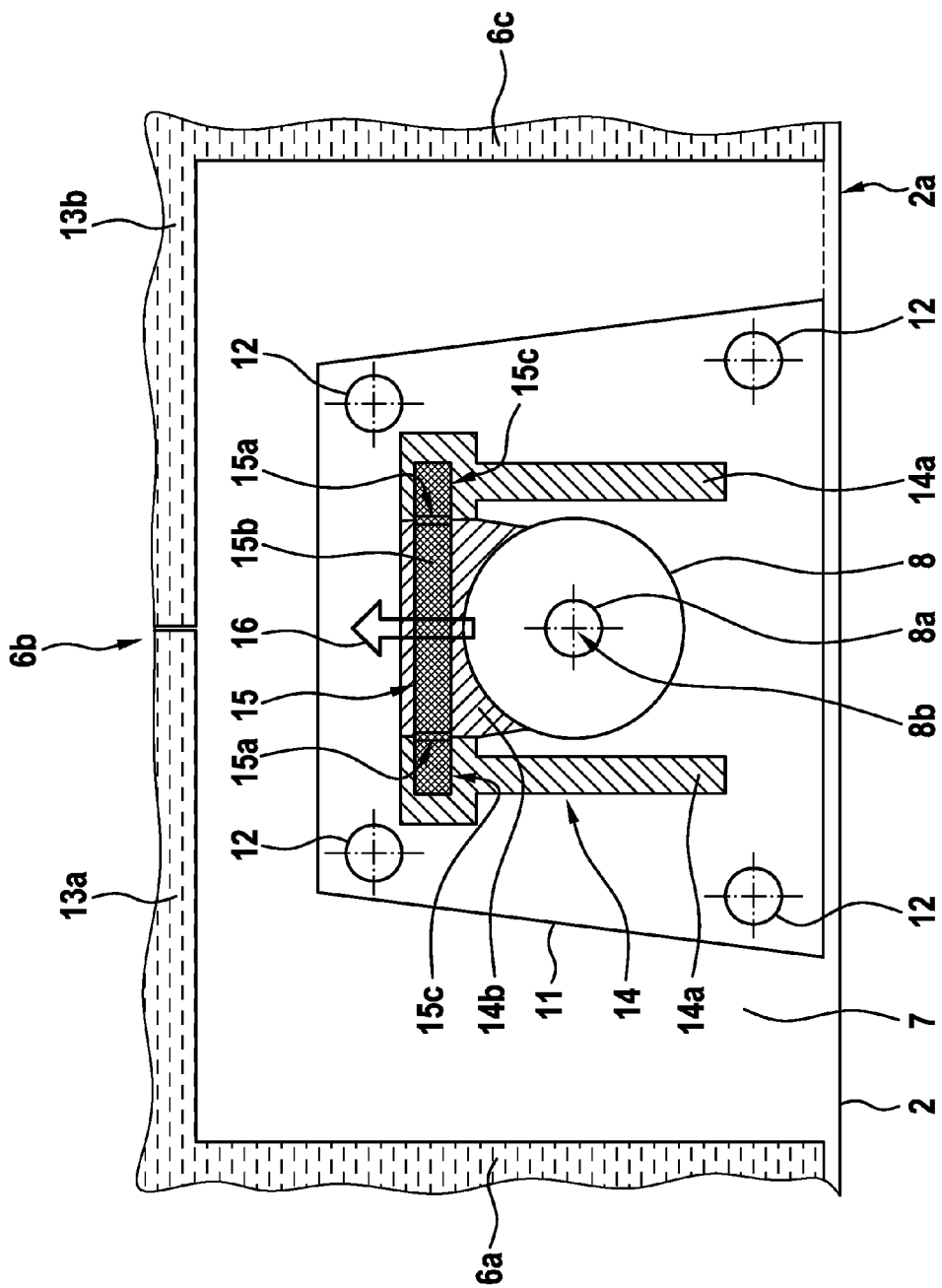
FIG. 8 shows a sectional view of the equipment bay of FIG. 7, seen along section line VIII-VIII of FIG. 7, with a crash fuse element and a crash fuse mount according to the present invention.

FIG. 8 shows the top fuel tank 6b, the two lateral fuel tanks 6d and the cargo hook compartment 7 with the cargo hook arrangement 8 of the preceding figures, as well as the structural frame attachment 11 with the fixation means 12 of FIG. 7. However, the longitudinal frame components 9b and the outer wall 7a of the preceding figures are not shown, for simplicity and clarity of the drawings.

Preferably, the top fuel tank 6b is an integral part of at least one of the front and/or rear fuel tanks 6a, 6c. Illustratively, the top fuel tank 6b is split into a front part 13a, which is an integral part of its adjacent front fuel tank 6a, and a rear part 13b, which is an integral part of its adjacent rear fuel tank 6c.

According to one aspect of the present invention, the structural frame attachment 11 is provided with a crash fuse mount 14 that holds the rotation shaft 8a of the cargo hook arrangement 8. In other words, the rotation shaft 8a and the crash fuse mount 14 are in direct contact with each other so as to permit a predetermined fuse action at least in a crash load case. The term "direct contact" means that the crash fuse mount 14 may bearingly contact the rotation shaft 8a or that a comparatively small radial distance may be provided between the crash fuse mount 14 and the rotation shaft 8a that avoids a frictional contact in operation of the cargo hook arrangement 8.

Preferably, the crash fuse mount 14 is at least adapted for absorbing energy in the crash load case, which is generated by forces introduced from the rotation shaft 8a into the crash fuse mount 14, as indicated with an arrow 16 that represents an exemplary crash load direction. The crash fuse mount 14 is preferentially a separate component which is integrated into the structural frame attachment 11 prior to or after attachment of the latter to the longitudinal frame component 9b.

Illustratively, the crash fuse mount 14 has two side parts 14a and a center part 14b that interconnects the two side parts 14a. Each side part 14a is exemplarily arranged between the rotation shaft 8a of the cargo hook arrangement 8 and one of the lateral fuel tanks 6d, and the center part 14b is exemplarily arranged between the rotation shaft 8a and the top fuel tank 6b. Thus, the crash fuse mount 14 exemplarily comprises the shape of a returned "U".

Preferably, the crash fuse mount 14 comprises at least one crash fuse element 15 that is provided with predetermined breaking points 15a. These predetermined breaking points 15a are preferentially adapted for breaking in the crash load case. Illustratively, the crash fuse element 15 comprises a central part 15b and two side parts 15c, which are interconnected by the central part 15b. The corresponding interconnections exemplarily define the predetermined breaking points 15a. By way of example, the crash fuse element 15 is bar-shaped or lath-shaped.

Illustratively, the central part 15b is accommodated in the center part 14b of the crash fuse mount 14 and each side part 15c is accommodated in a corresponding side part 14a thereof. Preferably, the crash fuse element 15 is a separate component which is integrated into the crash fuse mount 14 prior to or after attachment of the latter to the structural frame attachment 11.

In the crash load case, the center part 14b of the crash fuse mount 14 will be pushed in the direction of the arrow 16 due to the load on the cargo hook arrangement 8. The stress of the load will be transferred upon the crash fuse element 15, which comprises the predetermined breaking points 15a that will absorb the occurring crash load energy. The crash fuse element 15 will, thus, break as illustrated in FIG. 9 and the broken crash fuse parts 15b, 15c will remain in the corresponding parts 14b, 14a of the crash fuse mount 14.

Figure 9:
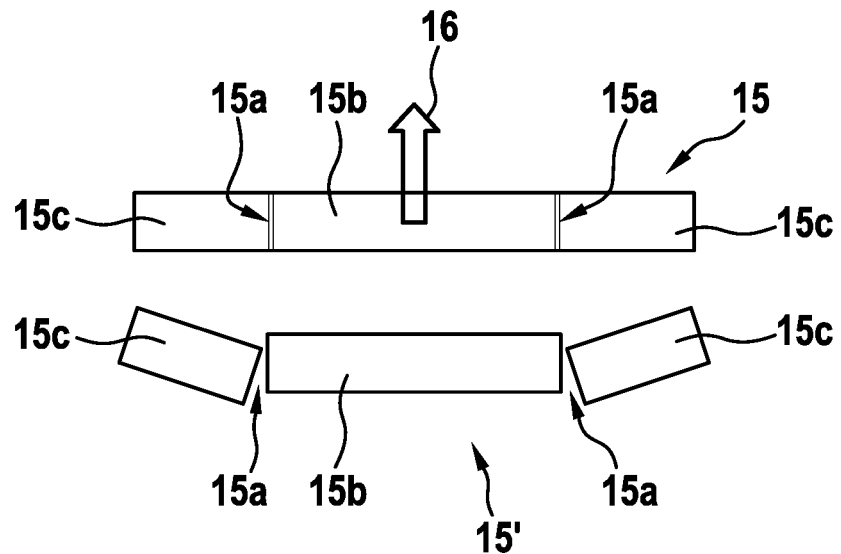
FIG. 9 shows the crash fuse element of FIG. 8 in normal and broken state.

FIG. 9 shows the crash fuse element 15 of FIG. 8 with the central part 15b and the two side parts 15c, which define the predetermined breaking points 15a. The crash fuse element 15 is shown in its preferred bar-shaped or lath-shaped form of FIG. 8 upon occurrence of the crash load case, wherein corresponding forces act on the central part 15b in the direction of the arrow 16 of FIG. 8. These forces lead to a breaking of the crash fuse element 15 at the predetermined breaking points 15a. The correspondingly broken crash fuse element is referred to with the reference sign 15'.

Figure 10:
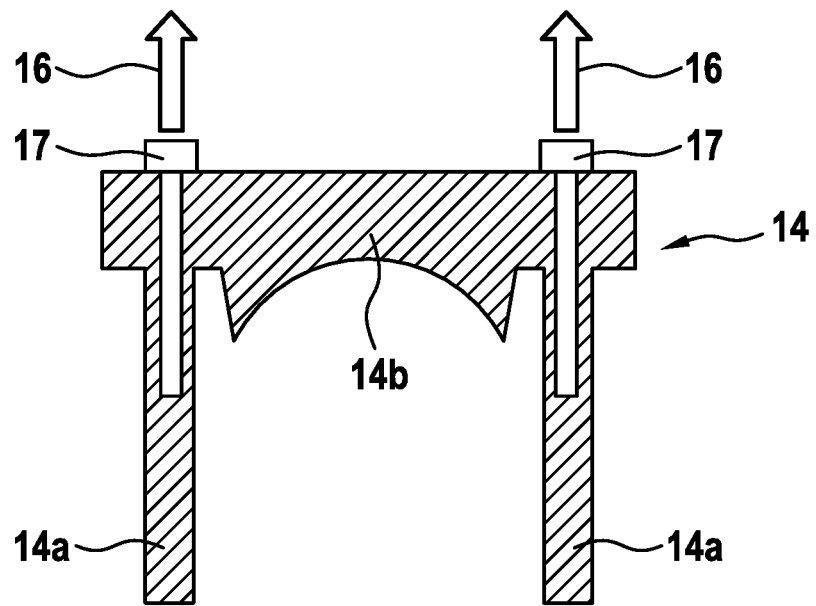
FIG. 10 shows the crash fuse mount of FIG. 8 with crash fuse fixation elements according to an embodiment of the present invention.

FIG. 10 shows the crash fuse mount 14 of FIG. 8, which can be slightly modified according to a variant of the present invention. More specifically, the crash fuse mount 14 can be provided, in contrast to FIG. 8, with crash fuse fixation elements 17 instead of the crash fuse element 15. The crash fuse fixation elements 17 are preferably embodied as vertically oriented screws or bolts that are provided in the side parts 14a of the crash fuse mount 14 and adapted to absorb all energy resulting in the crash load case from forces acting on the center part 14b of the crash fuse mount 14 in the direction of the arrow 16 of FIG. 8.

Figure 11:
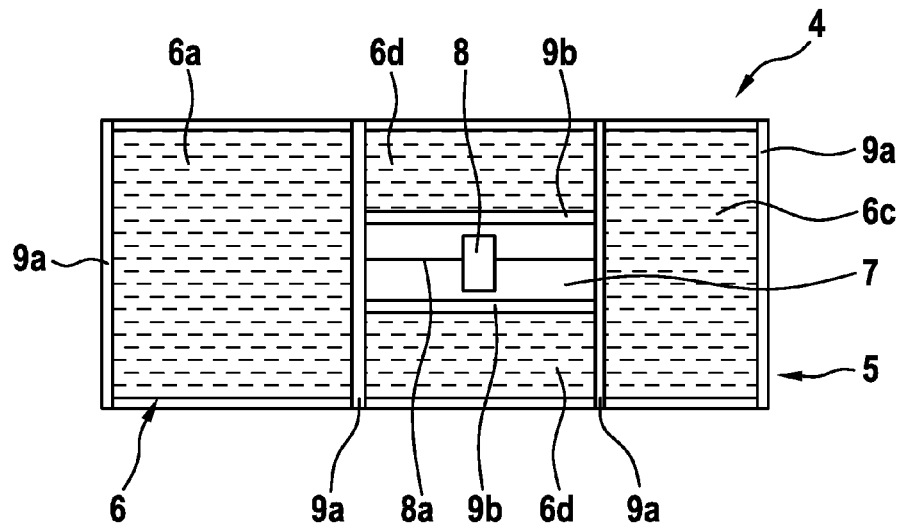
FIG. 11 to FIG. 14 show variants of the subfloor arrangement of FIG. 2.

FIG. 11 shows the subfloor region 4 of the preceding figures with the transversal and longitudinal frame components 9a, 9b that accommodates the subfloor arrangement 5 with the fuel tank arrangement 6 and the cargo hook compartment 7 with the cargo hook arrangement 8 of the preceding figures. However, according to a variant of the present invention, the cargo hook arrangement 8 is now rotatably mounted to the transversal frame components 9a instead of the longitudinal frame components 9b, as described above.

Figure 12:
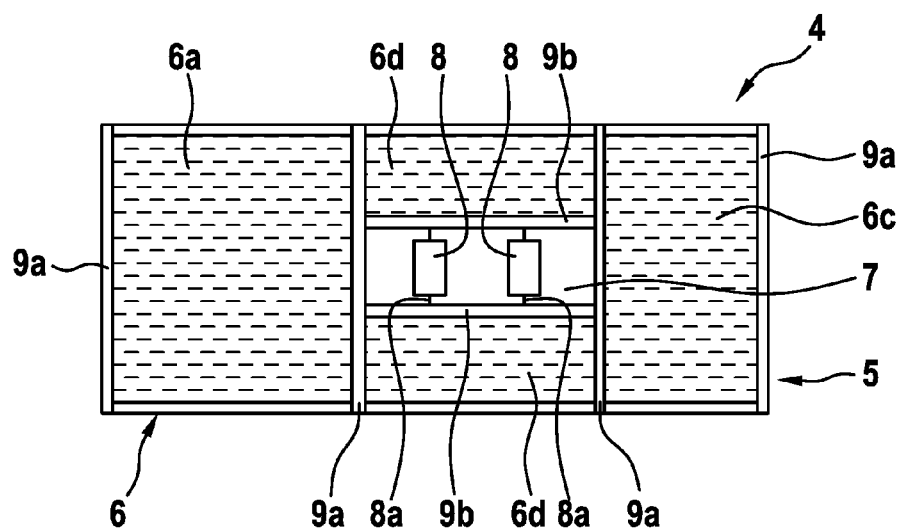

FIG. 12 shows the subfloor region 4 of the preceding figures that accommodates the subfloor arrangement 5 with the cargo hook compartment 7 of the preceding figures. However, according to a variant of the present invention the cargo hook compartment 7 now accommodates at least two cargo hook arrangements 8 instead of the single cargo hook arrangement 8, as described above.

Figure 13:
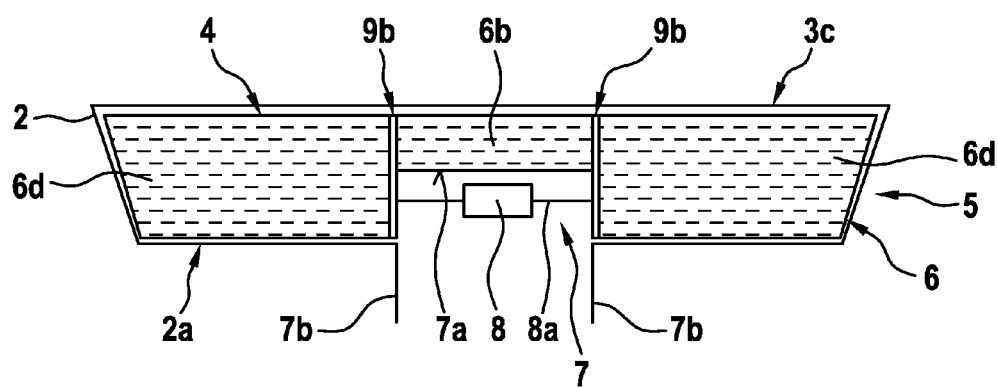

FIG. 13 shows the subfloor region 4 of FIG. 3 that accommodates the subfloor arrangement 5 comprising the cargo hook compartment 7 with the cargo hook arrangement 8 of FIG. 3. However, in contrast to FIG. 3 the cargo hook compartment 7 now comprises an access door 7b for closing the cargo hook compartment 7 at least in the above described stow mode, preferably sealingly.

Figure 14:
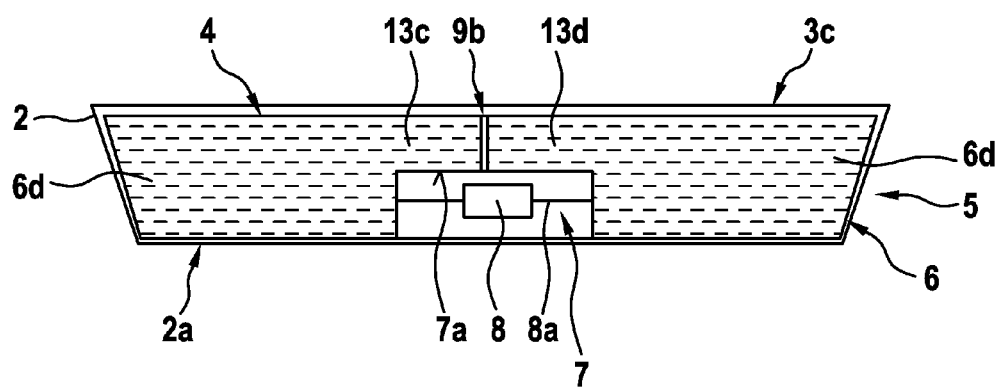

FIG. 14 shows the subfloor region 4 of the preceding figures that accommodates the subfloor arrangement 5 with the cargo hook compartment 7 and the fuel tank arrangement 6 having the top fuel tank 6b and the lateral fuel tanks 6d of the preceding figures. However, according to a variant of the present invention the top fuel tank 6b is now an integral part of at least one of the lateral fuel tanks 6d. Illustratively, the top fuel tank 6b is split into two lateral parts 13c, 13d, each of which is an integral part of its adjacent lateral fuel tank 6d.

Figure 15:
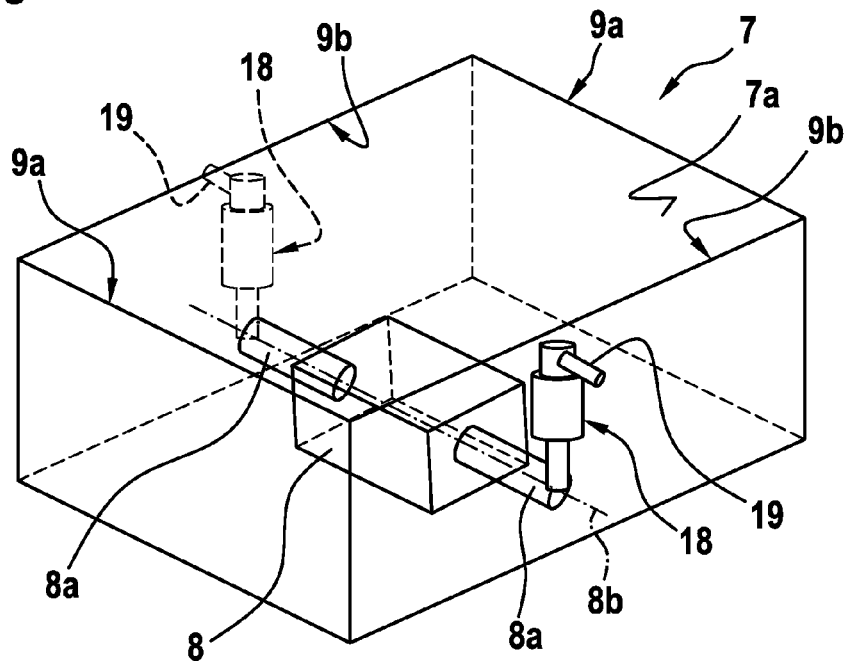
FIG. 15 shows the equipment bay of FIG. 7 with damping means according to an embodiment of the present invention.

FIG. 15 shows the cargo hook compartment 7 with the cargo hook arrangement 8 having the rotation shaft 8a of FIG. 7. However, according to a variant of the present invention the rotation shaft 8a is now rotatably mounted to damping elements 18, which are adapted to absorb all energy that occurs in the crash load case, instead of the structural frame attachments 11 of FIG. 7. Each damping element 18 is preferably attached to an adjacent transversal or longitudinal frame component 9a, 9b via suitable attachment means 19, such as screws or rivets.

More specifically, the damping elements 18 are preferably adapted to absorb even all energy resulting from very high loads (so-called "shock-loads"). Such shock-load energy may at least partly be transferred by the damping elements 18 via the suitable attachment means 19 to the longitudinal frame components 9a, 9b.

Figure 16:
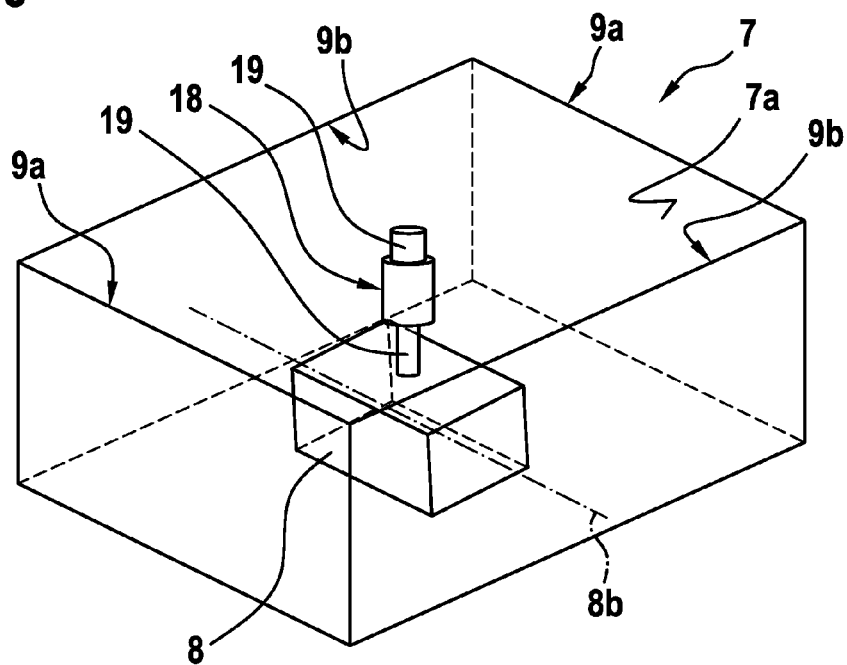
FIG. 16 shows the equipment bay of FIG. 7 with damping means according to another embodiment of the present invention.

FIG. 16 shows the cargo hook compartment 7 with the cargo hook arrangement 8 of FIG. 7, wherein illustration of the rotation shaft 8a of FIG. 7 is omitted for simplicity and clarity of the drawings. However, according to a further variant of the present invention the cargo hook arrangement 8 is now mounted by means of the attachment means 19 of FIG. 15 to the damping element 18 of FIG. 15, which in turn is mounted via the attachment means 19 of FIG. 15 to the outer wall 7a of FIG. 7.

It should be noted that modifications to the above described embodiments are within the common knowledge of the person skilled in the art and, thus, also considered as being part of the present invention. It should further be noted that the drawings are only intended for schematically representing embodiments of the present invention and not for showing detailed constructions thereof. For instance, the cargo hook arrangement 8 is generally shown as a simple box and sometimes represented together with the rotation shaft 8a and sometimes without. Sometimes also the rotation shaft 8a is illustrated all alone. However, this is merely done for simplicity and clarity of the drawings, as a detailed configuration of a suitable cargo hook arrangement and a rotatable mounting of such a cargo hook arrangement in general are well-known to the person skilled in the art, so that the schematic representation thereof in the drawings is considered as being sufficient for explaining the preferred realization modes according to the present invention. Otherwise, reference is made to the above-described prior art documents, where these items are described in more detail.

REFERENCE LIST 1 aircraft
1a multi-blade main rotor
1b, 1c rotor blades
1d rotor head
1e main rotor axis
1f skid-type landing gear
2 fuselage
2a fuselage underside
3a cockpit
3b cargo compartment
3c floor structure
3d tail boom
4 subfloor region
5 subfloor arrangement
6 fuel tank arrangement
6a front fuel tanks
6b top fuel tank
6c rear fuel tanks
6d lateral fuel tanks 7 cargo hook compartment
7a compartment outer wall
7b compartment access door
8 cargo hook arrangement
8' cargo hook first rotated position
8" cargo hook second rotated position
8a cargo hook rotation shaft
8b rotation axis
9a transversal frame components
9b longitudinal frame components
10 symmetry plane
11 structural frame attachments
12 fixation means
13a upper fuel tank front part
13b upper fuel tank rear part
13c, 13d upper fuel tank lateral parts
14 crash fuse mount
14a side parts
14b center part
15 crash fuse element
15' broken crash fuse element
15a breaking points
15b crash fuse central part
15c crash fuse side parts
16 crash load direction
17 crash fuse fixation elements
18 damping means
19 attachment means
AH axis height
CH compartment height
CL compartment length
CW compartment width
ED endpoint distance
FW fuselage width
SH subfloor region height
TH tank height

What is claimed is:

1. A rotorcraft with a fuselage, the rotorcraft comprising:
a floor structure that is arranged inside the fuselage defining a subfloor region between the floor structure and a fuselage underside of the fuselage;
an equipment bay with at least one auxiliary equipment arranged within the subfloor region, the at least one auxiliary equipment being at least partly stowable in the equipment bay in a stow mode; and
at least one auxiliary compartment being at least partly arranged in a region between the equipment bay and the floor structure such that the at least one auxiliary compartment separates the equipment bay from the floor structure;
wherein the at least one auxiliary equipment is forcibly moved in the equipment bay by a crash load from a stow position associated with the stow mode into at least one crash position in the equipment bay to reduce force on the auxiliary equipment.

2. The rotorcraft according to claim 1, wherein the equipment bay comprises at least one outer wall that separates the at least one auxiliary equipment from the at least one auxiliary compartment.

3. The rotorcraft according to claim 1, wherein the subfloor region is provided with a frame structure defined by transversal frame components and longitudinal frame components, the at least one auxiliary equipment being mounted to predetermined transversal and/or longitudinal frame components of the frame structure.

4. The rotorcraft according to claim 3, wherein the at least one auxiliary equipment comprises a shaft that is mounted to the predetermined transversal and/or longitudinal frame components of the frame structure.

5. The rotorcraft according to claim 4, wherein the shaft is mounted to the predetermined transversal and/or longitudinal frame components of the frame structure by means of structural frame attachments.

6. The rotorcraft according to claim 5, wherein at least one of the structural frame attachments is provided with a crash fuse mount that holds the shaft, the crash fuse mount being adapted for absorbing energy in a crash load case.

7. The rotorcraft according to claim 6, wherein the crash fuse mount comprises at least one crash fuse element that is provided with predetermined breaking points, the predetermined breaking points being adapted for breaking in the crash load case.

8. The rotorcraft according to claim 7, wherein the structural frame attachments are mounted to the predetermined transversal and/or longitudinal frame components of the crashworthy frame structure by means of associated fixation means.

9. The rotorcraft according to claim 1, wherein the equipment bay comprises an access door for closing the equipment bay in the stow mode, preferably sealingly.

10. The rotorcraft according to claim 1, wherein a plurality of fuel tanks is arranged around the equipment bay within the subfloor region, wherein the at least one auxiliary compartment defines a top fuel tank.

11. The rotorcraft according to claim 1, wherein the equipment bay is arranged within the subfloor region on the side of at least one lateral fuel tank, wherein the at least one auxiliary compartment defines a top fuel tank that is an integral part of the at least one lateral fuel tank.

12. The rotorcraft according to claim 11, wherein the equipment bay is separated from the at least one lateral fuel tank by at least one longitudinal frame component.

13. The rotorcraft according to claim 1, wherein the equipment bay is arranged within the subfloor region behind at least one front fuel tank and/or in front of at least one rear fuel tank, wherein the at least one auxiliary compartment defines a top fuel tank that is an integral part of the at least one front fuel tank and/or the at least one rear fuel tank.

14. The rotorcraft according to claim 13, wherein the equipment bay is separated from the at least one front fuel tank and/or the at least one rear fuel tank by at least one transversal frame component.

15. The rotorcraft according to claim 1, wherein at least one auxiliary equipment is a cargo hook arrangement, wherein the equipment bay defines a cargo hook compartment.

16. The aircraft according to claim 1, wherein a plurality of fuel tanks is arranged around the equipment bay within the subfloor region, wherein the at least one auxiliary compartment defines a top fuel tank.

17. An aircraft with a fuselage, the aircraft comprising:
a floor structure that is arranged inside the fuselage defining a subfloor region between the floor structure and a fuselage underside of the fuselage, wherein the subfloor region is provided with a crashworthy frame structure defined by transversal frame components and longitudinal frame components;
an equipment bay arranged within the subfloor region;
at least one auxiliary equipment at least partly stowable in the equipment bay in a stow mode, the at least one auxiliary equipment comprising a shaft that is mounted to the predetermined transversal and/or longitudinal frame components of the frame structure with structural frame attachments;

at least one auxiliary compartment being at least partly arranged in a region between the equipment bay and the floor structure such that the at least one auxiliary compartment separates the equipment bay from the floor structure, wherein at least one of the structural frame attachments is provided with a crash fuse mount that holds the shaft, the crash fuse mount being adapted for absorbing energy in a crash load case.

18. The aircraft according to claim 17, wherein the crash fuse mount comprises at least one crash fuse element that is provided with predetermined breaking points, the predetermined breaking points being adapted for breaking in the crash load case.

19. The aircraft according to claim 18, wherein the structural frame attachments are mounted to the predetermined transversal and/or longitudinal frame components of the crashworthy frame structure by means of associated fixation means.

* * * * *